(12) United States Patent
Derndinger (10) Patent No.: US 10,748,252 B2
(45) Date of Patent: Aug. 18, 2020

(54) METHOD AND DEVICE FOR IMAGE CORRECTION

(71) Applicant: Carl Zeiss AG, Oberkochen (DE)

(72) Inventor: Eberhard Derndinger, Aalen (DE)

(73) Assignee: Carl Zeiss AG, Oberkochen (DE)

( * ) Notice: Subject to any disclaimer, the term of this patent is extended or adjusted under 35 U.S.C. 154(b) by 241 days.

(21) Appl. No.: 15/779,901

(22) PCT Filed: Nov. 29, 2016

(86) PCT No.: PCT/EP2016/079087
§ 371 (c)(1),
(2) Date: May 30, 2018

(87) PCT Pub. No.: WO2017/093227
PCT Pub. Date: Jun. 8, 2017

(65) Prior Publication Data
US 2020/0126189 A1  Apr. 23, 2020

(30) Foreign Application Priority Data
Dec. 2, 2015 (DE) .................. 10 2015 120 967

(51) Int. Cl.
*G06T 3/60* (2006.01)
*G06T 5/00* (2006.01)
*G06F 17/18* (2006.01)

(52) U.S. Cl.
CPC ............. *G06T 3/608* (2013.01); *G06F 17/18* (2013.01); *G06T 5/003* (2013.01);
(Continued)

(58) Field of Classification Search
CPC ......... G06T 3/608; G06T 3/4053; G06T 7/37; G06T 7/42; G06T 5/002; G06T 5/003;
(Continued)

(56) References Cited

U.S. PATENT DOCUMENTS 7,176,962 B2     2/2007   Ejima
8,577,110 B2 *  11/2013   Kitamura .................. G06T 5/50
                                                                 382/128

(Continued)

FOREIGN PATENT DOCUMENTS

DE           69708195 T2        8/2002
DE        102015120967 A1       6/2017
(Continued)

OTHER PUBLICATIONS

Jia, et al., "Motion Blurred Image Restoration", 2013 6th International Congress on Image and Signal Processing (CISP2013), 2013, pp. 384-389.

(Continued)

*Primary Examiner* — Michael S Osinski
(74) *Attorney, Agent, or Firm* — Murphy, Bilak & Homiller, PLLC (57) ABSTRACT

Methods, apparatuses and computer programs for image processing are provided. A sequence of images, in particular, is processed in this case. The images are subdivided into tiles and the tiles are transformed into the frequency domain. By evaluating the argument of the spectral density in the frequency domain, it is possible to identify and rectify disturbances which, for example, are caused by air disturbances (flickering).

24 Claims, 3 Drawing Sheets

(52) U.S. Cl.
CPC ............... *G06T 2207/10016* (2013.01); *G06T 2207/10024* (2013.01); *G06T 2207/20021* (2013.01); *G06T 2207/20216* (2013.01)

(58) Field of Classification Search
CPC .. G06T 5/009; G06T 5/40; G06T 5/50; G06T 5/10; G06T 2207/20056; G06T 2207/20221; G06T 2207/10004; G06T 2207/10016; G06T 2207/10024; G06T 2207/10052; G06F 17/18; H04N 5/23248; H04N 5/2353; H04N 5/2354; H04N 5/208; H04N 5/23254; H04N 5/23261; H04N 5/23267; H04N 5/23277

See application file for complete search history.

(56) References Cited

U.S. PATENT DOCUMENTS

| | | | |
|---|---|---|---|
| 8,670,079 B2* | 3/2014 | Adachi | G06T 5/009 348/739 |
| 9,516,242 B2* | 12/2016 | Kerwien | G06T 5/50 |
| 9,538,090 B2* | 1/2017 | Spielberg | G03B 9/64 |
| 9,698,919 B1* | 7/2017 | Nielsen | H04B 17/345 |
| 9,897,792 B2* | 2/2018 | Rout | G02B 21/367 |
| 2002/0110276 A1* | 8/2002 | Kasutani | G06F 16/5838 382/165 |
| 2004/0005098 A1 | 1/2004 | Carrano et al. | |
| 2006/0088212 A1* | 4/2006 | Ohmi | G06K 9/00275 382/170 |
| 2009/0060312 A1* | 3/2009 | Kitamura | G06T 5/50 382/132 |
| 2009/0175505 A1* | 7/2009 | Muquit | G06K 9/00006 382/115 |
| 2009/0285478 A1* | 11/2009 | Thiebaud | H04N 1/60 382/166 |
| 2010/0284584 A1* | 11/2010 | Maeda | G06T 5/10 382/128 |
| 2011/0085074 A1* | 4/2011 | Sonoda | G03B 7/095 348/363 |
| 2012/0288212 A1 | 11/2012 | Arrasmith | |
| 2013/0216240 A1* | 8/2013 | Fukuchi | H04B 10/6161 398/208 |
| 2014/0198984 A1* | 7/2014 | Chen | G06T 7/001 382/167 |
| 2014/0270565 A1 | 9/2014 | Poyneer et al. | |
| 2015/0116705 A1* | 4/2015 | Harmsma | G01J 3/02 356/300 |
| 2017/0048006 A1* | 2/2017 | Nielsen | H04B 17/104 |

FOREIGN PATENT DOCUMENTS

| | | |
|---|---|---|
| WO | 2009108050 A1 | 9/2009 |
| WO | 2011139150 A1 | 11/2011 |

OTHER PUBLICATIONS

Fraser, Donald et al., "Atmospheric Turbulence Visualization with Wide-Area Motion-Blur Restoration", Optical Society of America, vol. 16, No. 7, Jul. 1999, pp. 1751-1758.

Lim, Jae S., "Two-Dimentional Signal and Image Processing", Prentice Hall PTR, 1990, 42 pages.

Powell, Mark W. et al., "A Scalable Image Processing Framework for Gigapixel Mars and Other Celestial Body Images", 2010 IEEE, IEEEAC Paper #1533, Version 1, Updated Aug. 5, 2009, pp. 1-12.

Ritter, Joerg et al., "A Partitioned Wavelet-based Approach for Image Compression Using FPGA's", IEEE 2000 Custom Integrated Circuits Conference, Nov. 16, 1999, 4 pages.

Yamauchi, Hideki et al., "Image Processor Capable of Block-Noise-Free JPEG2000 Compression with 30frames/s for Digital Camera Applications", 2003 IEEE International Solid-State Circuits Conference, Session 2, Multimedia Signal Processing, Paper 2.5, 2003, 10 pages.

Carrano, C. J., "Speckle Imaging over Horizontal Paths", SPIE Conference on High-Resolution Wavefront Control, Seattle, WA, Preprint, Jul. 8, 2002, 16 pages.

Lawrence, Taylor W., et al., "Extended-image Reconstruction through Horizontal Path Turbulence Using Bispectral Speckle Interferometry", http://opticalengineering.spiedigitallibrary.org, Optical Engineering, vol. 31 No. 3, Mar. 1992, pp. 627-635.

Weigelt, G., et al., "Image Reconstruction by the Speckle-masking Method", Optical Society of America, Optics Letters, vol. 8, No. 7, Jul. 1983, pp. 389-391.

Tolburst, D. J., et al., "Amplitude spectra of natural images", Ophthalmic and Physiological Optics, Apr. 1992, pp. 229-232.

\* cited by examiner

METHOD AND DEVICE FOR IMAGE CORRECTION

FIELD OF THE INVENTION

The present application relates to methods and apparatuses for image correction, and to corresponding computer programs. In particular, the present application relates to such methods and apparatuses that can be used for correcting an influence of air disturbances and/or for image stabilization, in particular for videos, i.e. image sequences, as well. Such image corrections, in which the influences of disturbances such as air disturbances (air schlieren) are compensated, are also referred to as image restoration or video restoration.

BACKGROUND

When optical systems such as telescopes or cameras, for example, are used in the atmosphere, disturbances in the optical imaging of the optical system may occur as a result of air disturbances. By way of example, air disturbances can be caused by solar irradiance, which in turn causes air turbulences. Such optical systems are often coupled to cameras or image sensors in order to facilitate an image recording.

Such air disturbances can lead to flickering, i.e. a movement, in the image and/or to unsharpness in the image, which can be observed through the optical system or which can be recorded by way of the optical system.

An unwanted movement in the image may likewise arise if the optical system is inadvertently moved during the image recording, for example as a result of tremors of an employed tripod. Additional disturbances may occur as a result of the scanning movement in the case of image recording devices that operate on a scanning principle, e.g. have a line sensor that records an object line by line or a sensor with a single pixel that scans an object to be recorded. A so-called slit scan laser scanning microscope (LSM) is an example of a so-called line sensor; an electron microscope or conventional laser scanning microscope is an example for recording a single pixel in conjunction with scanning of an object. Such movements can have translational and/or rotational components; i.e., both a shift and a rotation may occur.

Image disturbances that cause a movement, such as the aforementioned flickering or inadvertent movements of the optical system, are also disturbing, in particular, in the case of video recordings as well, i.e. in the case where a plurality of successive images are recorded.

In the case of digital image recording using an image sensor, as is usually used these days, there is the option of improving recorded images by subsequent computer-assisted processing. By way of example, there are various approaches for subsequently correcting unwanted movements or flickering by way of appropriate image processing. In some approaches, the flickering is reduced by registering prominent patterns such as prominent edges, for example, in the image. Expressed differently, prominent edges are determined in a sequence of images, for example in a video, and the images are corrected in such a way that the patterns in subsequent images are aligned. This approach works well if corresponding prominent features, e.g. edges, are present in the images, for example if many houses with windows occur. This becomes difficult in nature recordings with bushes, grass, etc., because prominent edges or other suitable patterns are less present or not present at all. If registering prominent patterns does not work in such a case, this may also have a negative effect on subsequent sharpening of the images should an employed sharpening algorithm be applied to a plurality of successive images.

A further approach is a so-called "speckle imaging", which is described in C. J. Carrano, "Speckle Imaging over Horizontal Paths", Lawrence Livermore National Laboratory, Jul. 8, 2002, for example. Further information in this respect was found in e.g. G. Weigelt and B. Wirnitzer, OPTICS LETTERS Vol. 8, No. 7, 1983, p. 389ff or Taylor W. Lawrence et al., OPTICAL ENGINEERING Vol. 31, No. 3, p. 627ff, 1992. The main disadvantage of speckle imaging is that it requires much computational time or corresponding high-power computers. Originally, speckle imaging was mainly used in astronomy where, at least in many applications, there is sufficient time for image post-processing and/or sufficient computational capacity available. For terrestrial recordings, which should often be carried out in real time, the implementation of such an approach on the basis of the speckle imaging at least requires much outlay since specially designed hardware (e.g. ASICs, application-specific integrated circuits) is required, or it may even be impossible. Moreover, moving objects, such as persons running or motor vehicles driving, for example, are processed just like air disturbances in the speckle imaging algorithm. This may lead to artifacts, in which these moving objects are typically blurred or even disappear in part.

SUMMARY

Therefore, it is an object of the present invention to provide methods, apparatuses and corresponding computer programs, by means of which such image corrections are implementable with little computational outlay.

To this end, a method as claimed in claim 1, an apparatus as claimed in claim 12 and a computer program as claimed in claim 15 are provided. The dependent claims define advantageous and preferred embodiments.

In accordance with a first aspect, a method for image processing is provided, including:
providing a sequence of images,
subdividing the images into tiles (i.e. one or more tiles),
transforming the tiles into the spatial frequency space,
identifying shifts by evaluating the argument of the spectral density function of the tiles in the spatial frequency space,
compensating at least some of the identified shifts, for example by averaging or by modifying the argument of the spectral density,
transforming the tiles back into real space, and
assembling the back-transformed tiles.

In this way, an unwanted movement can be removed from the sequence of images by calculation with comparatively little computational outlay. Compared to e.g. methods operating in real space, no registration at prominent image parts such as e.g. edges and the like is required by the treatment in spatial frequency space, and so the method can also operate robustly in situations in which such prominent image parts are not present or hardly present. Moreover, it is possible—while observing the sampling theorem—to carry out the compensation of movements with an accuracy of less than one picture element (pixel), for example in the region of 0.01 picture elements. This is often not possible using methods operating in real space.

The method may further include averaging over tiles corresponding to one another in the sequence of images (corresponding to averaging over time) prior to the assembly.

Residual shifts can still be removed by calculation as a result of the averaging.

The method may further include sharpening over tiles corresponding to one another in the sequence of images prior to or after the assembly.

A tile size when subdividing the images into tiles can be set depending on the size of air disturbances during the image recording and/or depending on strength of blurring during the image recording.

Subdividing, transforming, identifying, compensating and inverse transforming can be repeated N times, N≥1, wherein a size of the tiles can be incrementally reduced during the subdivision.

As a result of the incremental reduction in size, it is also possible to take account of smaller air turbulence cells, for example, and smaller shifts can be incrementally removed by calculation, further improving the image quality.

In different repetitions, different images of the sequence of images can be taken into account depending on a size of the tiles during the transformation, identification, compensation and/or inverse transformation.

A factor by which the tiles are reduced in size can differ between at least two of the repetitions.

As a result of this, it is possible to further reduce the computational outlay by virtue of dynamically adapting the considered tiles to the requirements.

The images can be color images. Here, subdividing, transforming and inverse transforming can be carried out separately for each color channel.

The shifts can then be identified on the basis of grayscale values, obtained e.g. by averaging the color channels, and the compensation for the color channels can be carried out on the basis of the results of the identification for each color channel. The same may also apply to other calculations for image correction purposes: parameters for image correction can be obtained on the basis of grayscale values and an image correction then can be carried out for each color channel on the basis of the parameters.

In this way, it is also possible to process color images.

The identification can be applied on the basis of frequencies (in the spatial frequency space) below a frequency threshold value, i.e. at low frequencies. This simplifies identification, which is generally easier at low frequencies, as the absolute value of the spectral density is generally comparatively high in the case of lower frequencies. As a result of the determination on the basis of low frequencies, it is possible, in particular, to simplify the determination of parameters of the shift.

The identification may include distinguishing between shifts from interferences and shifts by moving objects, wherein the latter are essentially excluded during the compensation. In this way, it is possible to exclude moving objects from the image processing and hence said moving objects can be obtained without artifacts.

One or more method steps of the above-described method can be adapted dynamically
depending on the tiles and/or content of the images. Thus, a flexible approach depending on the requirements is possible.

One or more method steps of the method described above can be carried out in parallelized fashion in order to increase the speed. By way of example, the transformation and/or other described calculations, which may be relatively time-consuming depending on the image size, can be carried out in parallelized fashion. By way of example, the calculation for each tile or else for groups of tiles can be carried out in separate computing devices, e.g. in separate kernels. In other embodiments, the transformation for different lines and/or columns of the image, too, can be carried out in parallel.

In accordance with a second aspect, an apparatus for image processing is provided, comprising:
a computing device having at least one processor and a memory, wherein a sequence of images is storable in the memory, wherein the processor is configured to carry out the following steps:
subdividing the images into tiles,
transforming the tiles into the spatial frequency space,
identifying shifts by evaluating the argument of the spectral density function of the tiles in the spatial frequency space,
compensating the shifts, for example by modifying the argument of the spectral density or by averaging,
transforming the tiles back into real space, and
assembling the inverse-transformed tiles.

The apparatus can be configured to carry out the above-described methods.

The apparatus can further comprise an optical system and a camera device, coupled to the optical system, for recording the sequence of images. By way of example, the camera device can have a 2D image sensor, in which n×m picture elements, n, m each >1, can be recorded simultaneously. However, it may also have a 1D image sensor (line sensor) or a 0D image sensor (a single picture element) and operate in scanning fashion in order to record a desired object, for example.

According to a third aspect, provision is made of a computer program with program code which, when executed on a computing device, carries out the method as described above. By way of example, the computer program can be present on a data medium or in a memory, or can be provided via a network.

BRIEF DESCRIPTION OF THE DRAWINGS

Below, the invention is explained in more detail on the basis of embodiments, with reference being made to the attached drawings. In the Figures.

DETAILED DESCRIPTION

Various embodiments are explained in detail below. It should be noted that these embodiments only serve illustrative purposes and should not be construed as limiting. By way of example, embodiments with a plurality of elements or components are presented. This should not be construed as meaning that all of these elements or components are essential for the implementation of embodiments. Instead, other embodiments can also have fewer than the presented or described elements or components and/or can have alternative elements or components. In yet further embodiments, additional elements or components may be provided, for example elements used in conventional optical systems or computing devices. Components or elements of different embodiments can be combined with one another, unless indicated otherwise. Variations and modifications which are described for one of the embodiments may also be applicable to other embodiments.

The present invention considers image corrections. Within the scope of the present application, an image is understood to mean an individual image or an image of a video, which is composed of a plurality of successive images. In the case of videos, such an image is also referred to as a frame. Within the scope of this application, a sequence of images denotes a sequence of images recorded in succession. By way of example, such a sequence of successive images can be recorded or reproduced as a video, or else as a sequence of individual images recorded quickly in succession.

Figure 1:
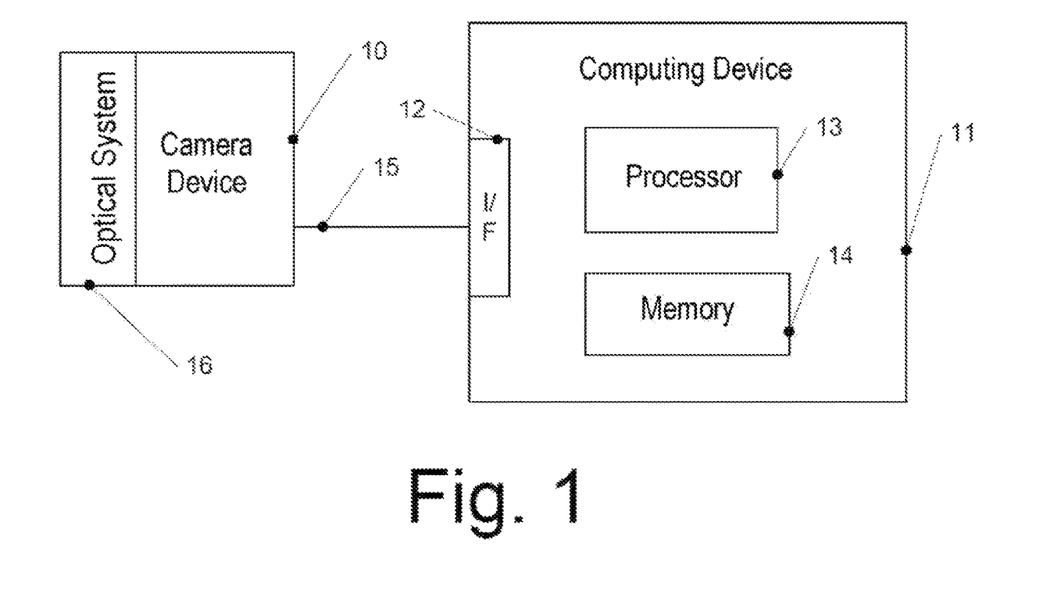
FIG. 1 shows a schematic illustration of an apparatus according to one embodiment.

FIG. 1 shows an apparatus according to an embodiment. The apparatus of FIG. 1 comprises a camera device 10 that is coupled to an optical system 16. The optical system 16 can be a refractor, a telescope or a microscope, for example, the camera device 10 being coupled thereto. In another embodiment, the optical system 16 also can be simply a camera lens of the camera device 10. One or more objects to be recorded are imaged on the image sensor of the camera device 10, for example a CCD (charge-coupled device) sensor or a CMOS (complementary metal-oxide-semiconductor) sensor, by way of the optical system 16. As already mentioned at the outset, the camera device can comprise a 2D image sensor. However, by means of scanning, images can also be recorded line-by-line using a 1D image sensor or point-by-point (0D image sensor). Here, the terms camera device and image sensor should be interpreted broadly and relate to any type of device that can be used to record images of one or more objects; by way of example, they also comprise electron microscopes and laser scanning microscopes (LSM). Consequently, the camera device 10 can record a sequence of digital images by way of the optical system 16. The apparatus of FIG. 1 further comprises a computing device 11, which may comprise one or more processors 13 and assigned memory 14, for example a non-volatile memory (e.g. flash memory), random access memory (RAM) or read only memory (ROM). In particular, program code that facilitates the performance of the image corrections described in more detail below when the program code is executed in the computing device 11 on the processor 13 can be stored in the memory 14. The program code can be supplied to the computing device 11 by way of a data medium (memory card, CD or DVD data medium, etc.) or via a network, for example.

In order to be able to process the images received by the camera device 10, the computing device 11 can receive the images by means of an interface 12 by way of a link 15. By way of example, this can be carried out directly via a wired or wireless link, for example if the camera device 10 and the computing device 11 are arranged spatially contiguously, for example in a microscope system. However, it is entirely also possible for the images to be written on a memory card or other storage media in the camera device 10, for example, and for these images then to be transmitted to the computing device 11 from this storage medium. A transmission via computer networks, for example the Internet, optionally also with one or more relays, is also possible. The images can be processed in a timely fashion in the computing device immediately after the images are recorded, in particular in real time as well, or else this can be carried out in a temporally separated manner. In other embodiments, the computing device 11 can be integrated in the camera device 10, for example within a video camera. Consequently, the illustration in FIG. 1 does not imply any special spatial relationship between the camera device 10 with the optical system 16 on the one hand and the computing device 11 on the other hand.

In particular, the computing device can carry out a sequence of processing steps with a recorded sequence of images, which are explained in more detail below with reference to FIG. 2. As already explained, these steps can be implemented by means of appropriate programming of the processor 13. Here, the processor 13 can be a universally usable processor such as a CPU, or else, for example, a specific graphics processor or any other processor or a combination thereof. Specific graphics processors are often used within cameras, for example, while general processors are often used for image processing on a computer, for example. The implementation of the present invention in this respect is not restricted to any special arrangement. In principle, it is likewise possible to implement the image processing described below by means of special hardware components, for example application-specific integrated circuits (ASICs) or field programmable gate arrays (FPGAs).

Figure 2:
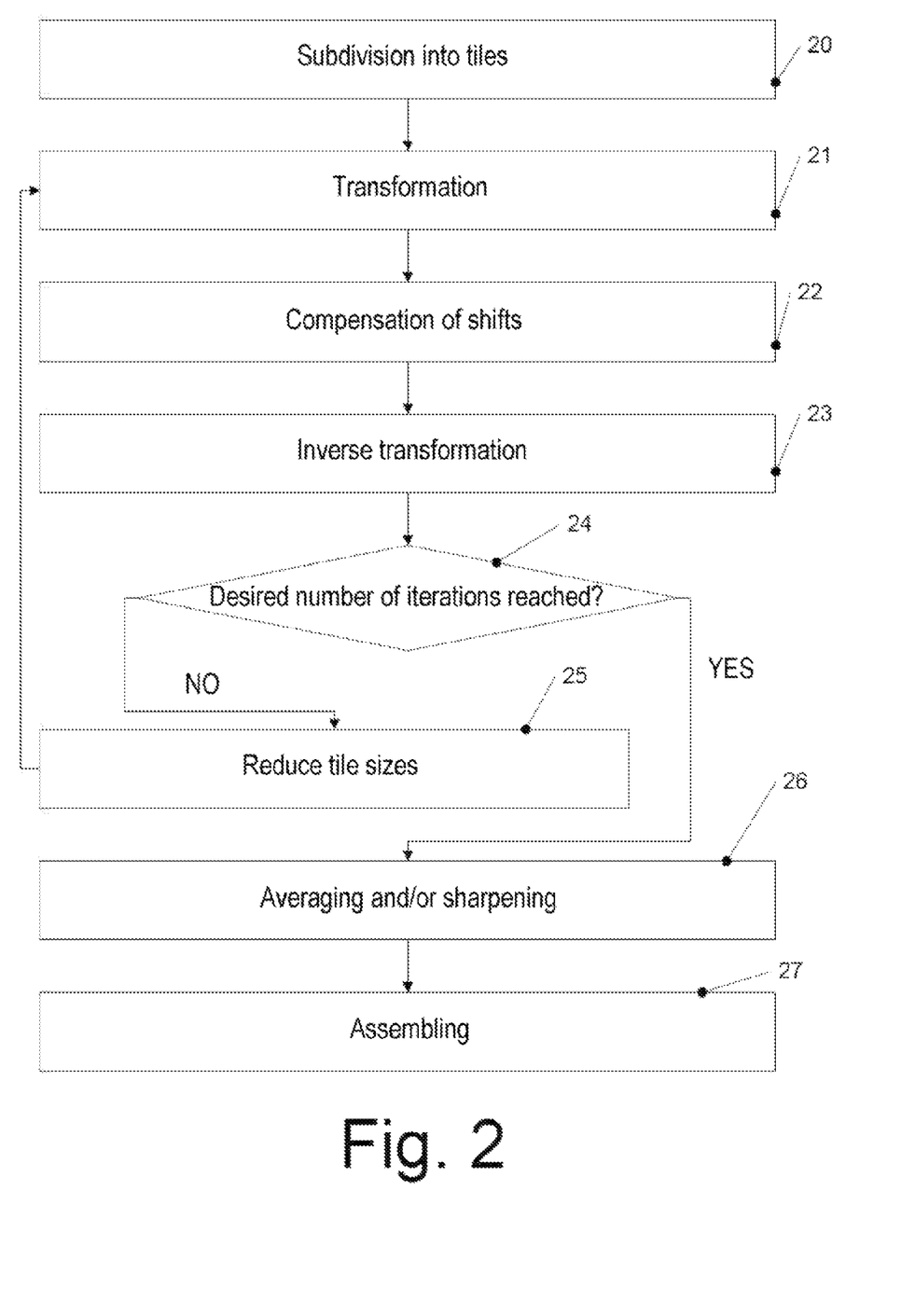
FIG. 2 shows a flowchart for elucidating a method according to one embodiment.

FIG. 2 shows a flowchart of a method according to an embodiment which can be implemented, for example as explained above, in the apparatus discussed in FIG. 1, in particular in the computing device 11. Initially, an overview of the method is provided. Then, the various method steps are explained in detail. Lastly, various variations, developments and application options of the method are discussed.

A sequence of images is used to carry out the method. By way of example, in order to process a specific image in the sequence of images, a certain number of adjacent images is used, for example 15 images before and 15 images after the specific image. The specific image can also be referred to as image to be restored. Thus, in order to restore a specific image, a block of 31 images, in particular 31 images recorded in succession, would be used in this example. The number of 15 images before and after the image to be restored, however, only serves as an example and any other number can be used, too, depending on available images and available computing capacity. Here, the number of used images before and after the image to be restored need not be equal. The images are preferably recorded quickly in succession with a shorter temporal aperture.

In the sequence of images, various events can lead to a change in the image content over time, i.e. from image to image. Here, some of these events are unwanted and can be corrected by the method according to the invention.

Thus, the camera device can carry out a translational and/or rotational movement, which is unwanted in the case of tremors and the like. This movement leads to a corresponding movement in the image content. Also, an entire recorded object can move. Moreover, flickering can be produced by air disturbances, as already explained above. Finally, only parts of the recorded image can move, too, for example if a movable object such as an automobile or truck is recorded.

The method in FIG. 2, as initially explained, is particularly suitable for black/white or grayscale images. A transfer to color images is explained in more detail below.

In step 20 of FIG. 2, the images of the sequence of images are subdivided into tiles, i.e. into portions. In step 21, there is a transformation into the frequency domain, for example by way of a Fourier transform.

In step 22, shifts of image parts, which have arisen due to air disturbances, for example, are identified and compensated or removed by calculation in the spatial frequency space. In step 23, there then is an inverse transformation, for example by way of an inverse Fourier transform.

A check is carried out in step 24 as to whether a desired iteration number of calculations has been reached. If not, tiles that are reduced in size are used in step 25 (the tile dimension is halved, for example) and steps 21 to 23 are run through again with the reduced tiles. If so, averaging over the sequence of images is carried out for each tile in step 26, for example to average out remaining shifts from image to image, and/or the images are sharpened. Then, in step 27, the titles are composed to form a completed, corrected image, which then can be processed further or observed.

Now, the individual steps of the method in FIG. 2 are explained in more detail. Initially, the subdivision into tiles from step 20 is explained with reference to FIGS. 3 and 4. Here, the tiles preferably have one or more of the following properties:

Where possible, the dimension of the tiles should be smaller than the largest region of disturbances in the image, for example smaller than the largest cells of air disturbances when compensating air disturbances.

Shifts of the image as a result of blurring and the like, for example as a result of unstable tripod holders for a refractor, should be significantly smaller than the dimensions of the tiles, for example at most one half, at most one third or at most one quarter of the tile dimension.

It should be easy to be able to reassemble the tiles at the end of the method.

Figure 3:
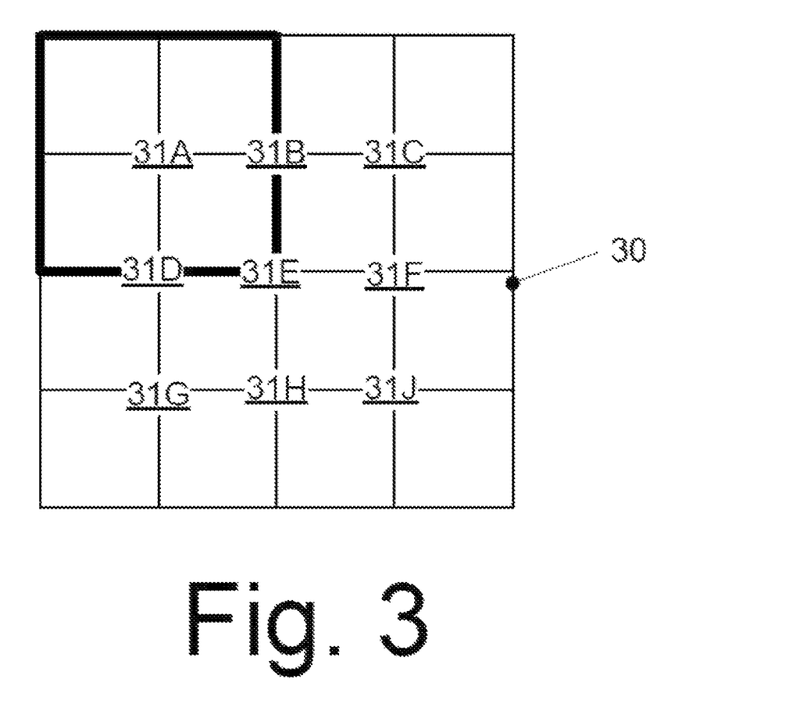
FIGS. 3 and 4 shows diagrams for elucidating some steps of the embodiment in FIG. 2.

By way of example, a tile dimension for step 20 can be an edge length in the region of one quarter or one eighth of the image dimension. The tiles can be square. In the case of a typical image with 2048×1024 pixels (picture elements), it is possible, for example, to select a tile dimension of 256×256 pixels, with other dimensions also being possible. Preferably, the tiles overlap in this case in such a way that each pixel not lying in the edge region is present in four tiles. FIG. 3 shows such a subdivision for elucidation purposes. In the example of FIG. 3, an image 30 is subdivided into nine (3×3) tiles 31A-31J. Each tile comprises four of the small squares, with the reference sign being placed at the center in each case. In order to clarify this, the tile 31A is presented in FIG. 3 with a bold outline.

As can be seen, only the pixels in the corners belong to only one tile in this subdivision, other edge pixels each belong to two tiles and pixels in the central small squares each belong to four tiles. Here, FIG. 3 only serves for elucidation purposes and, depending on the image size, the number of tiles may also differ, in particular be greater, for example like in the pixel example above.

The tiles are preferably multiplied by a weighting function. As a result, artifacts during the transformation following in step 21 can be suppressed. Various suitable window functions for this weighting are known per se. The weighting in two dimensions for the case of FIG. 3 is illustrated schematically in FIG. 4. Here, the three tiles are multiplied in each direction by a weighting function 40 in each case, said weighting function dropping off toward the edge of the tile. In the overlapping regions, the weighting functions preferably have a behavior ensuring that the overlapping weighting functions are constant in terms of their sum, e.g. yield 1 (indicated by line 41), such that the tiles can subsequently be unified again to form an overall image by simple addition. Here, the Hanning window function is a suitable window function, wherein other window functions can also be used.

The decomposition into tiles is applied to each image in the sequence of images (e.g. the 31 images in the numerical example above).

It should be noted that if the movement to be compensated is the same in the entire image or occurs in the entire image, use can be made of only a single tile; i.e., this single tile then comprises the entire image.

Then, in step 21, a transformation from the spatial domain into the spatial frequency domain is carried out for each of the tiles, with this transformation being a two-dimensional transformation in accordance with the two-dimensional image. In a preferred embodiment, use is made of a Fourier transform, in particular Fast Fourier Transform (FFT). However, it is also possible to use other types of transformation, for example other spectral transformations, on which the precise calculation is then carried out in subsequent step 22. By way of example, use can be made of a wavelet transform. Then, each image in real space corresponds to a corresponding spectral density in spatial frequency space.

This transformation and/or calculations described below, which may be relatively time-consuming depending on the image size, can be carried out in parallelized fashion in some embodiments. By way of example, the calculation for each tile or else for groups of tiles can be carried out in separate computing devices, e.g. in separate kernels. In other embodiments, the transformation for different lines and/or columns of the image, too, can be carried out in parallel. Thus, for example, a 2D Fast Fourier Transform (FFT) is carried out in two sections, for example initially in a first direction (x-direction, line-by-line) and then in a second direction (y-direction, column-by-column). In each of these two sections, such an FFT for the various lines or columns can be carried out in different kernels or in any other way with different computing devices, for example in 1024 kernels in the case of 1024 lines.

Then, in step 22, the shifts in the images, i.e. shifts in an object position from image to image, which can be caused by blurring or by air disturbances, for example, are identified and removed by calculation. The occurrence of air disturbances or blurring of the optical system leads, in particular, to a shift in each of the affected tiles according to the shift theorem of the image content from image to image. To this end, it is advantageous, as explained above within the scope of the tile formation, if the tile dimension is smaller than the corresponding cells of air disturbances. In the frequency domain, in which the tiles are present after the transformation of step 21, this shift according to the shift theorem is shown as a frequency-proportional change of the argument of the spectral density.

The shift theorem for shift by $x_0$ is the following in one dimension:

$$u(x-x_0) \circ\!\!-\!\!\bullet^{\mathcal{F}} \exp(-i2x_0 f)U(f)$$

where $\mathcal{F}$ represents a spectral transformation (e.g. Fourier transform) $u(x)$ describes the image in real space and $U(f)$ describes the corresponding transform of the image, i.e. the spectral density, in spatial frequency space. $\exp(\cdot)$ is the exponential function. It can be seen that the shift in the real space by $x_0$ corresponds to a change of the argument of the spectral density in spatial frequency space. Here, the change of the argument of the spectral density for displacement $x_0$ is proportional to the frequency f. A corresponding statement in two dimensions applies for the case of two-dimensional images and two-dimensional tiles.

The possible changes within the sequence of images over time, explained above with reference to FIG. 2, can be detected by corresponding changes in the spectral density, in particular in the argument of the spectral density.

Thus, a translational movement of the camera device (e.g. tremors or the like) or a movement of the entire recorded object over time leads to a change in the argument of the spectral density from image to image over time, with this change being proportional to frequency, as explained above. The factor by which the argument of the spectral density changes proportional to frequency, i.e. $x_0$ in the equation above, for example, can be ascertained particularly easily and robustly at low spatial frequencies f.

A flickering as a result of air disturbances disturbances can be exhibited in different ways, depending on the tile dimensions. In the case of relatively large tiles in comparison with the dimension of disturbing air cells, flickering is expressed in stationary fluctuations of the spectral density over time. In this case, use can be made later of a time-averaged value, for example a value of the spectral density subject to arithmetic averaging over the image sequence or a part thereof or else an averaged argument of the spectral density and an averaged absolute value of the spectral density, at each spatial frequency for compensation depending on the design of the corresponding apparatus and the dynamic conditions in the recorded images. This mean value is then inserted into the corrected image. Here, it was found, in particular, that the use of an averaged absolute value supplies good results, even if an arithmetic mean of the entire spectral density is probably more correct from a mathematical point of view.

In the case of small tiles in relation to the air cell dimension, flickering is exhibited in stationary shifts according to the shift theorem over time presented above. However, tiles which are large in comparison with the air cell dimension are preferably used for correction purposes, as explained above.

In the case of the movement of part of an object, too, for example the movement of an automobile or truck in the image, a distinction has to be made according to small and larger tiles. In the case of small tiles that lie completely on the moving part of the image, the movement is expressed in a factor, with an argument proportional to frequency, corresponding to the shift theorem, with the argument proportional to frequency, in particular $x_0$, changing linearly over time.

The situation is more complex in the case of tiles that are only partly situated on the moving object. Therefore, such tiles are less well-suited to the detection of moving image parts.

The various changes in the image, as discussed above, in particular also disturbances as a result of movement of the camera device or flickering caused by air disturbances, are expressed at least inter alia in a change proportional to frequency in the argument of the spectral density. Here, the shift $x_0$ is included as a factor of proportionality, as is clear from the equation above for the shift theorem.

In order to determine $x_0$ or other parameters that describe the change proportional to frequency as a result of the shift, it is possible to determine a mean value of the spectral density by averaging the spectral density that has assigned to it a certain number of images. The aforementioned parameters that describe the aforementioned changes proportional to frequency by shifts can then be determined relatively easily for each tile at low frequencies in relation to the mean value. The parameters determined thus at low frequencies also apply, at least approximately, to higher frequencies and can therefore be used for all frequencies.

Determining the parameters, in particular $x_0$, at low frequencies is comparatively easy because the absolute values of the spectral density are comparatively high at low spatial frequencies. Therefore, the shift $x_0$, for example, can be determined relatively robustly here. Here, it should moreover be noted that the Shannon sampling theorem is not satisfied in usual video recordings. This leads to errors, at least at high spatial frequencies and possibly also at mid spatial frequencies. Once the value $x_0$ has been determined for a tile or an image, this value is also valid for the spectral density at higher spatial frequencies and it can, moreover, also be used as a shift in the spatial domain.

On the basis of the parameters determined thus, the component proportional to frequency, caused by the shift, in relation to the mean value is removed by calculation from the spectral density in the spatial frequency space for each tile, substantially corresponding to a compensation or equalization of the shift. Here it is possible to identify which image disturbances (flickering, blurring, etc.) are possibly present, in particular by comparing the parameters for spatially and/or temporally adjacent tiles, and such disturbances can be corrected. Moreover, this shift-dependent component proportional to frequency can be stored for subsequent calculations so that such component can still be used at a later time. After this calculation, the image content of each tile no longer shifts from image to image. Here, the absolute value of the spectral density remains unchanged since this change is reflected in the argument, as explained above. In another embodiment, the absolute value of the spectral density in step 22 can be averaged over all images in the sequence of images in order to reduce noise and in order to suppress disturbances such as flickering caused by air disturbances. In any case, a shift from image to image is at least reduced, if not even removed, in the spectral domain after step 22.

Now, various examples for the image correction, in particular for the compensation of shifts, are explained.

In some embodiments, averaging over time, for example by separately averaging argument and absolute value, is sufficient in the case of relatively large tiles for compensating translational movements of the camera device and/or of the entire recorded image and/or a flickering as a result of air disturbances.

By way of example, if—as mentioned above—use is made of only a single tile, it is possible to carry out such separate averaging of argument and absolute value at each desired frequency in the spatial frequency space. In other embodiments, it is possible to carry out a level fit in respect of the change of the argument according to the shift theorem from image to image in the spatial frequency space in order to compensate the disturbing movement and, optionally, to determine a movement to be separated (i.e., a movement that is actually present, for example as a result of the movement of a recorded object). This can be used in the case of 2D image sensors, in particular. By way of example, a movement to be separated can be present if video recordings are made from an airplane. Then, the movement to be separated is caused by the movement of the airplane. A similar statement applies in the case of other vehicles. Such a movement may also occur in the case of other applications, for example in the case of an operating microscope, for example in respect of a movement of a surgeon with his instruments in relation to a movement of a microscope head over the patient at rest (which should be compensated, for example).

A plurality of tiles are preferably used if there only is movement of some image parts Thus, it is possible to treat image parts with the moving objects differently to image parts without such objects. In the process, it is possible to maintain a movement of objects to the best possible extent, while unwanted movements are compensated. The number and size of the tiles can be adapted dynamically in the process, for example by using a pattern recognition method to recognize where and in which tiles moving objects occur.

In order also to take account of a movement of part of the recorded image (for example of an automobile or a truck), it is possible, in some embodiments, to leave tiles in which such an occurrence was identified, for example on account of a relatively large movement in the respective image part, unchanged (unrestored). In order to take account of such effects even more accurately, it is also possible to use tiles that are small in comparison with the size of air turbulence. Here, use is made of tiles that are adjacent in time and space in order to identify movements of only parts of the image and in order to subsequently carry out the compensation where necessary.

If, as a result of this, it is recognized that only flickering as a result of air disturbances occurs in a tile, this can be compensated as described above, i.e., by averaging and/or by determining and removing by calculation the respective shift.

If it is recognized that flickering is present in a tile and moreover a moving object is present in its entirety in the tile, these can be separated from one another by considering the dependence over time since flickering causes fluctuations while the shift increases linearly, for example in the case of a movement. By way of this separation, it is then possible to correct only the fluctuation over time caused by flickering.

If it is recognized that, in addition to flickering in a tile, there is a moving object only partly in the region of the respective tile, it is possible to ascertain how the shift over time by flickering is in adjacent tiles by analysis thereof. This shift can then be interpolated for the current tile and subsequently be used for compensation purposes. By way of example, the shift from adjacent tiles can be averaged. Then, compensation is carried out once again on the basis of the shift theorem with a factor proportional to frequency.

Then, in step 23 there is an inverse transformation corresponding to the transformation of step 21. By way of example, if the transformation in step 21 was a Fourier transform, in particular Fast Fourier Transform, there is an inverse Fourier transform, in particular an inverse Fast Fourier Transform (IFFT) in step 23.

These steps 20-23 can be repeated with incrementally smaller tiles until the desired number of iterations is reached. By way of example, a single iteration, as described above, may suffice to compensate blurring, for example as a result of tremors of a stand. Should finer corrections be obtained, in particular for a relatively small air disturbances, it is possible to carry out more than one iteration. To this end, the tiles are reduced in size in step 25. By way of example, the side length of the tiles can be halved. Here, the rules for tile formation described above (see the description of step 20) are preferably taken into account. In particular, the rules must be observed both in the preceding iterations and during the current iteration since an entire image should again be assembled at the end.

Figure 4:
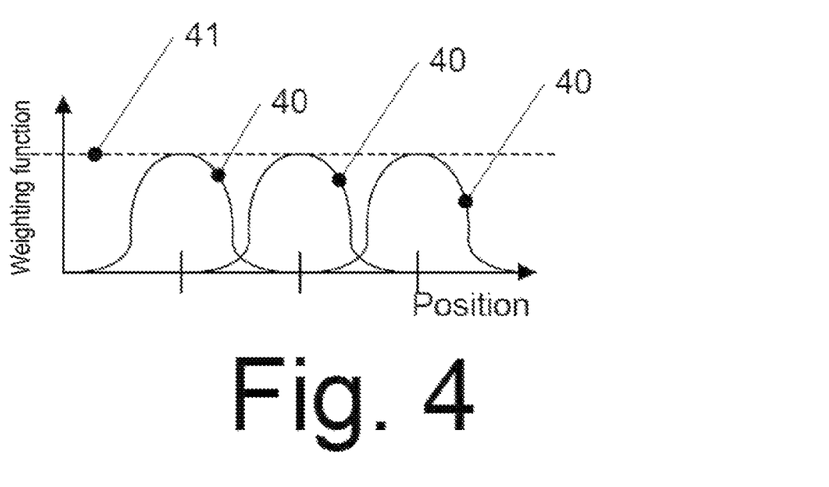

For the aforementioned example of halving the side length, this means, for example in some embodiments, that the multiplication by the Hanning window as explained with reference to FIG. 4 is not carried out at the outer edges of the larger tiles and only toward the center since there already was appropriate weighting by the multiplication with the Hanning window at the outer edges of the larger tiles in a preceding step. Then, steps 21-23 are repeated with the tiles that are reduced in size. Depending on computational capacity, this size reduction of the tiles can be carried out multiple times such that steps 21-23 are carried out with ever smaller tiles.

The following points are preferably taken into account for reducing the size of the tiles:

If the image content in one tile shifts too far, for example by more than approximately one quarter of the side length of the tile, artifacts may occur since then there is a significant change in the image content and it is not only a comparatively small shift that occurs. Therefore, a start is initially made with sufficiently large tiles in step 20 and said tiles are then incrementally reduced in size, with correspondingly large shifts being compensated in each step, said shifts then no longer being present in subsequent steps.

In the aforementioned calculation of step 22, only the translational shift of the image content is captured within a tile for restoration purposes, with the shift theorem being used, as explained above. Flickering, which is caused by air turbulence cells that are smaller in comparison with the tile dimension, remains unconsidered. In order to consider said flickering, it is necessary to carry out a further iteration with correspondingly smaller tiles. This is due to the fact that a phase-modulated sine/cosine function in the spatial domain has a spectral density in the form of a Bessel function, i.e. a spectral density that has a broad spectrum by the phase modulation in addition to a fundamental frequency. This means that flickering of small cells (i.e., small in comparison with the tile dimension) caused by air disturbances, for example, is exhibited by a relatively complex spectral density that is difficult to treat. As a result of the incremental reduction in the size of the tiles, such a flickering can be treated in a relatively simple manner as described above for step 22 if the tile dimension is smaller than a region of the flickering or other shifts. Consequently, it is possible to make the number of iterations and the carried out reduction in size dependent on how much computational time is available and how small air turbulence cells or other effects should be taken into account.

The above-described embodiments can be used for various applications. By way of example, it is possible to restore videos recorded by refractors or other optical systems, particularly in the case of terrestrial applications, for example nature recordings. However, in principle, an application in astronomy is also possible. By applying the method described, it is possible to increase, e.g. double, the effective resolution in some embodiments. By way of example, this can be used in the case of an electronic zoom, in which small image sections are enlarged.

During the reduction in tile dimension from level to level, care has to be taken that no adjacent pixel values, for example from different planes, i.e., from iteration to iteration, are added. This distinguishes the presented approach from pyramid algorithms, in which pixel values of images are added together or averaged in order, as it were, to climb up the pyramid level by level.

In some embodiments, the reduction in the dimension of the tiles in step 25 can be selected in an unchanging manner from iteration to iteration. By way of example, halving of the tile dimension can be carried out in each iteration of step 25. In other embodiments, different reductions in size may also be used. By way of example, a factor by which the side lengths of the tiles are divided may vary from iteration to iteration. The number of iterations and the reduction in size of the tiles can be carried out dynamically, for example according to the current area and movement amplitude of shifts, which are caused by air disturbances, for example. By way of example, the size adaptation can be carried out on the basis of shifts determined in step 22 in the preceding image sequences, for example within the last second. The reduction in size of the tiles can also vary over the image; i.e., it is not necessary for all tiles to experience the same reduction in size.

By way of example, image parts in which objects that are close to the optical system are imaged can vary differently to other image parts, in which objects that are further away or objects over relatively warm objects, which causes more flickering, are imaged. Stronger flickering is present in the case of objects that are further away than in the case of closer objects. Thus, for example, the tile dimension can be reduced in size more quickly from iteration to iteration in an image part with close objects than in image parts in which air disturbances plays a greater role. By way of example, some reduction steps can also be omitted in some image parts. The precise adaptation may depend on a respective application.

Once the desired number of iterations has been reached, averaging and/or sharpening is carried out in step 26. For the purposes of averaging, the argument of the spectral density of each tile is averaged over a certain number of images, for example the aforementioned sequence of images. Corresponding averaging can also be carried out for the absolute value of the spectral density. In this way, it is possible to average out residual shifts that are possibly still present. Instead of averaging argument and absolute value separately, other approaches for averaging are also possible, for example averaging the complex spectral density values in the Cartesian, complex coordinate system. Similar to step 22, this averaging consequently has the purpose of compensating shifts, in this case residual shifts, that are not compensated by steps 22 in the iterations.

By way of such averaging over time in step 26 and/or already previously in step 22, it is moreover possible to reduce noise, for example photon noise of the employed camera device. Averaging over a plurality of images in the spatial frequency domain to this end is of interest, in particular, if there is a translational movement of the camera device or of the entire image or else a movement in part of an image. As already mentioned above, such movements in the spatial frequency domain can be identified comparatively easily. These movements can then be excluded from averaging because, otherwise, unwanted artifacts could be produced by averaging moving objects. In particular, the movement in the spatial frequency domain can easily be described over time, e.g. linearly or by means of a simple fit, or it can easily be compensated for the averaging. Consequently, averaging over time is relatively simple in the spatial frequency domain, even in the case of moving images. Such averaging would be difficult in the time domain.

Moreover, it is possible to carry out filtering, for example a Wiener filtering, by means of which absolute values of the complex spectral density that are greater than a predetermined threshold value absolute value, for example greater than a noise level, are weighted more strongly during the averaging. An influence of noise can be efficiently reduced in this manner.

In order to compensate the loss of sharpness as a result of air disturbances disturbances, it is additionally possible to amplify absolute values of higher frequency spectral density components, for example absolute values above a certain threshold value frequency, during sharpening. This procedure is known per se from the speckle imaging algorithm, for example from D. Korff, Journal of the Optical Society of America, volume 63, number 8, August 1973, page 971ff.

According to this conventional procedure, this amplification can be carried out taking account of the temporal aperture of an image, shorter here, of e.g. 33 ms. What aids this is that it is not necessary to exactly determine the amplification factors for amplifying the absolute values of the higher-frequency spectral density components. Depending on properties of the occurring air turbulence cells or air disturbances, it is possible to set the amplification differently, in particular also dynamically, i.e. in a time varying manner from the image sequence to image sequence, depending on the respective tile.

In principle, any conventional sharpening algorithm can be used. For each tile, for example for each of the tiles illustrated in FIG. 3 in an exemplary manner, sharpening can be carried out differently from tile to tile and dynamically changing over time depending on the respective application. By way of example, as is known conventionally per se, sharpening can be carried out by convolution over the image or the tiles in the spatial domain or by amplifying the absolute values in the frequency domain. Expressed differently, a preceding transformation can be used for sharpening or sharpening can be carried out in the spatial domain.

Here, it should be noted that unsharpness can also be caused by, inter alia, air disturbances, with the unsharpness increasing with air disturbances disturbances that become more pronounced. Therefore, sharpening can take place depending on occurring air disturbances disturbances in some embodiments.

In a simplified procedure, the same sharpening can be applied to an entire field here. However, in a preferred embodiment, the flickering is determined for each tile (for example by determining the parameter $x_0$ and the analysis thereof over time) as explained above, and sharpening can be carried out depending on the determined flickering. By way of example, more pronounced sharpening can be carried out in the case of stronger flickering since increased flickering is also accompanied, as a rule, by greater unsharpness.

Then, the tiles are assembled back into a single image in step 27. If the aforementioned criteria are taken into account during the tile formation, this can be effectuated by simple summation of the tiles. Otherwise—for example, if no suitable window function is used—values in the overlap region of tiles must be averaged where necessary. Other procedures are also possible.

Compared to the conventional speckled algorithm, the calculation in step 22 using the argument of the spectral density and the change thereof proportionate to frequency is simplified, and so a faster calculation is possible. Also, only a single tile dimension is used in the conventional speckle imaging algorithm, and they are not a plurality of iterations, as is the case in some embodiments of the present application. The method described with reference to FIG. 2 can be varied and extended in various ways. Some of these variations and extensions are explained in more detail below.

As mentioned, the method of FIG. 2 can initially be applied to black/white or grayscale value videos. However, an extension to color videos or other colored sequences of images is possible. In one embodiment, the subdivision into tiles and the transformation or inverse transformation (steps 20, 21, 23 and optionally 25 in FIG. 2) are carried out separately here for different color channels. By way of example, in the case of a sequence of RGB (red, green, blue) images, these steps are carried out separately for the red channel, the green channel and the blue channel. Step 22 and averaging at 26 can then be carried out on grayscale values that are formed on the basis of the red, green and blue components. By way of example, a spectral density for grayscale values is formed in step 22 from the spectral densities for the red, green and blue channel by averaging, and changes to be carried out in the argument of the spectral density, as described above, are ascertained on the basis of this spectral density for grayscale values. These changes can then be applied to the spectral densities for the red, green and blue channel.

Here, the averaging can also be carried out as weighted averaging. By way of example, it is possible, in the process, to take account of the fact that the human eye is more sensitive to green light than to red or blue light, and so the green channel can be weighted higher than the red or the blue channel. A similar procedure can be carried out with the means and/or sharpening of step 26.

Moreover, the method of FIG. 2 can be extended in some embodiments to the effect of being able to distinguish between "real" movements and unwanted movements (for example as a result of the aforementioned air disturbances). By way of example, such "real" movements can be objects that move through the recorded images, for example a driving motor vehicle or a moving person.

In some embodiments, it is possible to identify a moving object by virtue of the argument of the spectral density in a tile varying more strongly than in adjacent tiles during the same time interval, for example varying more strongly than a predetermined threshold. By way of example, within a time interval, the values of the argument of the spectral density can vary by +/−90 degrees in a considered tile, while the argument during the same time interval only varies by +/−30 degrees in adjacent tiles. From this, it is possible to deduce that a moving object is situated in the considered tiles, while the changes in the argument in the adjacent tiles may have been caused by air disturbances and the like, for example.

If this determines that a moving object is situated in a certain tile, various procedures are possible. In some embodiments, such a tile can be displayed simply without restoration (i.e., without carrying out step 22 and/or step 26 for this tile, for example). In other embodiments, the components of the changes of the argument of the spectral density for the moving object and for the flickering, for example, can be separated from one another in order, for example, only to compensate the component for the flickering without falsifying the component for the moving object. In some embodiments, this can be carried out on the basis of the size of the change in the spatial domain. By way of example, the area of large-area flickering, caused by large-area air disturbances, will often be greater than that of small, moving objects. Optionally, this can be carried out on the basis of the tile dimensions during the various iterations.

In other embodiments, a distinction is made on the basis of the movement direction. A moving object often moves uniformly or at least in the same direction at all times during a time interval, whereas flickering caused by air disturbances, for example, has a fluctuating character such that the shifts can change the direction in this case. It is also possible to use other properties in terms of which disturbances by air disturbances or other unwanted movements differ from normal moving objects as a basis for the distinction.

As already explained, the embodiments explained above can be applied to a sequence of images, for example images of a video. In this way, it is possible to compensate disturbances such as air disturbances or tremors. However, it is also possible to output only a single image as a result, as is usual in conventional single image photo cameras. In this case, a sequence of images is recorded by a camera device such as the camera device illustrated in FIG. 1, said sequence of images comprising the image to be output at the end and a number of images before and after the image in order to be able to carry out the above-described method. Here, such recordings can be recorded with a high frame rate, for example with 300 frames per second. In this way, it is possible in the ultimately output individual image to compensate a distortion or shifts as a result of flickering as described above, with it optionally being possible to take account of moving objects, as described above. Moreover, it is possible to carry out a sharpening (step 26 in FIG. 2), which is adapted to recognized disturbances, for example air disturbances disturbances.

As mentioned previously, the method of FIG. 2 can also be used for image stabilization, i.e., for compensating tremors or blurring. Here, it may be sufficient to use only one tile dimension (i.e., use one iteration of steps 21 to 23 in FIG. 2). In this application, it is typically only the translational shift, i.e. a shift in a certain direction, that is compensated. To this end, it is possible, as described, to carry out an analysis of the shift (i.e., the change of the argument of the spectral density after the transformation at 21) over time, wherein it is possible to distinguish between shifts on account of tremors from object movements (as described above). Thus, the shift can be compensated very accurately in some embodiments, in part with an accuracy of less than one pixel.

It is also possible to output a multiple of the shift within the scope of image stabilization. This is explained using the example of an operating microscope as an optical system (e.g. optical system 16 of FIG. 1). The assumption is made that the operating microscope has a 10-fold magnification and this is already displayed at the operating microscope head with a monitor via an eyepiece. In the case of such an application, it may be advantageous, taking account of the movement of the operating microscope head on an arm that may have several meters length, not to completely stabilize the image on the monitor but to move it opposite to the operating microscope head movement on the monitor of the operating microscope head in order to show a stable image to the observer, who is not moving in respect of the patient and the floor. By way of example, the movement of the image on the monitor can then be $-\frac{1}{10}$-times or $+\frac{1}{10}$-times the movement recorded by the camera in the operating microscope head, depending on the optical design. Thus, it is not the entire shift that is compensated in this case, but deliberately only a part or multiple thereof. As a result of this, the movement, caused by the work of the surgeon, of the object recorded by the operating microscope can be reproduced without errors in this exemplary case and it is also possible to produce an image movement of the monitor image. Hence, it is possible to display an intuitively understandable image to the surgeon. A small rotation or change in magnification caused by the movement of the operating microscope head can likewise be stabilized at least approximately using correspondingly small tiles, wherein, for this stabilization, each small tile receives a translational shift that is slightly different to that of the other tiles.

The example of an operating microscope above only serves for further elucidation of, in particular, a non-complete compensation of the shift and should not be construed as restrictive since the presented embodiments can be generally applied to camera devices with optical systems as described with reference to FIG. 1.

What is claimed is:

1. A method of image processing by a computing device, for a temporal sequence of images, the method comprising:
transforming a plurality of images of the temporal sequence of images into the spatial frequency space using a spectral transformation, to obtain a spectral density for each of the plurality of images, identifying at least one shift by evaluating a frequency-proportional change of the argument of the spectral density over the plurality of images in spatial frequency space, compensating the frequency-proportional change of the argument of the spectral density to compensate the shift, and inverse transforming at least one of the plurality of images with compensated shift back into real space using the spectral transformation, to obtain at least one improved image.

2. The method of claim 1, further comprising refraining from compensating the frequency-proportional change of the argument of the spectral density to compensate the shift if the shift has a known characteristic indicative that the shift is not to be compensated.

3. The method of claim 2, wherein the known characteristic is a characteristic of a motion of an object.

4. The method of claim 1, wherein the compensating further comprises calculating a mean value for the spectral density and using a known characteristic of at least one parameter of the shift as a function of time.

5. The method of claim 4, wherein the known characteristic of the at least one parameter is a periodic characteristic, and wherein the compensating comprises removing the component proportional to frequency caused by the shift using a level fit in respect of the change of the argument of the spectral density from image to image in the plurality of images.

6. The method of claim 4, wherein the known characteristic of the at least one parameter is linearly proportional to time and wherein the compensating comprises separately averaging the argument of the spectral density and the absolute value of the spectral density over time.

7. The method of claim 1, further comprising subdividing each image of the plurality of images into a plurality of tiles, wherein the transforming comprises transforming the plurality of tiles for each image, and the identifying comprises evaluating the frequency-proportional change of the argument of the spectral density of corresponding tiles over the plurality of images, and where the inverse transformation comprises inverse transforming the plurality of tiles.

8. The method as claimed in claim 7, wherein the subdividing, transforming, evaluating, compensating, and inverse transforming is repeated iteratively in N iterations, N >1, wherein a size of the one or more tiles is incrementally reduced for each iteration, wherein for each subsequent iteration the sequence of images is provided based on the at least one improved image resulting from the previous iteration, wherein for each iteration the identifying of shifts and the compensating of shifts is carried out for the respective tile size, wherein the identifying and the compensating of the shifts is performed based on different tile sizes in the different iterations.

9. The method as claimed in claim 1, wherein the images are color images, wherein the transforming, identifying, compensating, and inverse transforming are carried out separately for each color channel of the color images, wherein the compensation for the color channels is carried out separately on the basis of the results of the identifying.

10. The method as claimed in claim 1, wherein the images are color images, wherein the method comprises averaging color channels of the color images to obtain grayscale values, where the identifying is performed on the basis of the grayscale values obtained by averaging color channels.

11. An apparatus for image processing, comprising:
a computing device having at least one processor and a memory, wherein a sequence of temporal images is storable in the memory, and wherein the processor is configured to:
receive the temporal sequence of images,
transform a plurality of images of the temporal sequence of images into the spatial frequency space using a spectral transformation, to obtain a spectral density for each of the plurality of images,
identify at least one shift by evaluating a frequency-proportional change of the argument of the spectral density over the plurality of images in spatial frequency space,
compensate the frequency-proportional change of the argument of the spectral density to compensate the shift, and
inverse transform at least one of the plurality of images with compensated shift back into real space using the spectral transformation, to obtain at least one improved image.

12. The apparatus as claimed in claim 11, where the processor is further configured to refrain from compensating the frequency-proportional change of the argument of the spectral density to compensate the shift, if the shift has a known characteristic indicative that the shift is not to be compensated.

13. The apparatus as claimed in claim 12, wherein the known characteristic is a characteristic of a motion of an object.

14. The apparatus as claimed in claim 11, wherein, to compensate the shift, the processor is configured to calculate a mean value for the spectral density and use a known characteristic of at least one parameter of the shift as a function of time.

15. The apparatus as claimed in claim 14, wherein the known characteristic of the at least one parameter is a periodic characteristic, and wherein, to compensate the shift, the processor is configured to remove the component proportional to frequency caused by the shift, using a level fit in respect of the change of the argument of the spectral density from image to image in the plurality of images.

16. The apparatus as claimed in claim 14, wherein the known characteristic of the at least one parameter is linearly proportional to time and wherein, to compensate the shift, the processor is configured to separately average the argument of the spectral density and the absolute value of the spectral density over time.

17. The apparatus as claimed in claim 11, where the processor is further configured to subdivide each image of the plurality of images into a plurality of tiles and transform the plurality of tiles for each image, and wherein, to identify the at least one shift, the processor is configured to evaluate the frequency-proportional change of the argument of the spectral density of corresponding tiles over the plurality of images, and further wherein, to inverse transform the at least one of the plurality of images, the processor is configured to inverse transform the plurality of tiles.

18. The apparatus as claimed in claim 17, where the processor is further configured to perform a sharpening over the one or more tiles in spatial frequency space,
wherein the sharpening comprises amplifying absolute values of higher frequency spectral density components of the spectral density function in the spatial frequency space.

19. The apparatus as claimed in claim 17, wherein the processor is further configured to: iteratively repeat subdividing, transforming, evaluating, compensating, and inverse transforming in N iterations, N>1, reduce a size of the one or more tiles incrementally in each iteration, wherein for each subsequent iteration the processor is configured to:

provide the sequence of images based on the at least one improved image resulting from the previous iteration, and perform the identifying of shifts and to carry out the compensating of shifts for the respective tile size, wherein the processor is further configured to perform the identifying and the compensating of the shifts based on different tile sizes in the different iterations.

20. The apparatus as claimed in claim 19, wherein a factor by which the tiles are reduced in size differs between at least two of the iterations.

21. The apparatus as claimed in claim 11, wherein the images are color images, and wherein the processor is configured to carry out the transforming, identifying, compensating, and inverse transforming separately for each color channel, and wherein the processor is configured to carry out the compensation for the color channels separately on the basis of the results of the identification.

22. The apparatus as claimed in claim 11, wherein the images are color images, wherein the processor is configured to identify shifts on the basis of grayscale values obtained by averaging the color channels.

23. The apparatus as claimed claim 11, wherein the identifying is carried out on the basis of frequencies below a frequency threshold value.

24. A non-transitory computer readable medium storing a computer program comprising program code which, when executed on a computing device, configures the computing device to:

receive a temporal sequence of images, transform a plurality of images of the temporal sequence of images into the spatial frequency space using a spectral transformation, to obtain a spectral density for each of the plurality of images, identify at least one shift by evaluating a frequency-proportional change of the argument of the spectral density over the plurality of images in spatial frequency space, compensate the frequency-proportional change of the argument of the spectral density to compensate the shift, and inverse transform at least one of the plurality of images with compensated shift back into real space using the spectral transformation, to obtain at least one improved image.

* * * * *

UNITED STATES PATENT AND TRADEMARK OFFICE
CERTIFICATE OF CORRECTION

| | | |
|---|---|---|
| PATENT NO. | : 10,748,252 B2 | Page 1 of 1 |
| APPLICATION NO. | : 15/779901 | |
| DATED | : August 18, 2020 | |
| INVENTOR(S) | : E. Derndinger | |

It is certified that error appears in the above-identified patent and that said Letters Patent is hereby corrected as shown below:

On the Title Page

Page 2/other publications (Line 4), please change "Dimentional" to -- Dimensional --.

In the Specification

Column 9, Line 8, please change "disturbances disturbances" to -- disturbances --.

Column 10, Line 62, please change "parts" to -- parts. --.

Column 11, Line 47, please change "for a" to -- for --.

Column 13, Line 61, please change "disturbances disturbances" to -- disturbances --.

Column 14, Line 25, please change "disturbances disturbances" to -- disturbances --.

Column 14, Line 27, please change "disturbances disturbances" to -- disturbances --.

Column 16, Line 12, please change "disturbances disturbances" to -- disturbances --.

Signed and Sealed this
Twenty-third Day of February, 2021

Drew Hirshfeld
*Performing the Functions and Duties of the
Under Secretary of Commerce for Intellectual Property and
Director of the United States Patent and Trademark Office*